United States Patent [19]

Ichiyama et al.

[11] Patent Number: 4,613,842
[45] Date of Patent: Sep. 23, 1986

[54] IRON CORE FOR ELECTRICAL MACHINERY AND APPARATUS AS WELL AS METHOD FOR PRODUCING THE IRON CORE

[75] Inventors: Tadashi Ichiyama, Sagamihara; Shigehiro Yamaguchi, Fujisawa; Tohru Iuchi, Kawasaki; Yoshihiro Ohya, Kitakyushu, all of Japan

[73] Assignee: Nippon Steel Corporation, Japan

[21] Appl. No.: 615,871

[22] Filed: May 31, 1984

Related U.S. Application Data

[63] Continuation of Ser. No. 197,133, Oct. 15, 1980, abandoned.

[30] Foreign Application Priority Data

Oct. 19, 1979 [JP] Japan .................... 54-134237
Dec. 11, 1979 [JP] Japan .................... 54-160501
Dec. 11, 1979 [JP] Japan .................... 54-160502
Jan. 25, 1980 [JP] Japan .................... 55-7477

[51] Int. Cl.[4] .......................... H01F 27/24
[52] U.S. Cl. .......................... 336/218; 148/111; 148/121; 310/42; 310/216
[58] Field of Search .......................... 310/42, 216–218; 148/121, 111, 120; 336/218

[56] References Cited

U.S. PATENT DOCUMENTS

| | | | |
|---|---|---|---|
| 1,136,942 | 4/1916 | Cutten | 310/42 X |
| 2,628,273 | 2/1953 | Somerville | 336/218 X |
| 2,774,000 | 12/1956 | Ross | 310/216 |
| 2,792,511 | 5/1957 | Horstman | 310/216 |
| 2,968,860 | 1/1961 | Mereness | 310/216 X |
| 3,076,160 | 1/1963 | Daniels | 336/218 |
| 3,647,575 | 3/1972 | Fiedler et al. | |
| 4,293,350 | 10/1981 | Ichiyama et al. | 148/111 |

Primary Examiner—Donovan F. Duggan
Attorney, Agent, or Firm—Kenyon & Kenyon

[57] ABSTRACT

For the iron cores of an electrical machinery and apparatuses, such as transformers, electric motors and generators, mostly a grain-oriented electromagnetic steel sheet is used. Since the grain-oriented electromagnetic steel sheet has a (110) [001]texture and is thus easily magnetized in the rolling direction, the direction of magnetic flux in the iron cores is required to be coincident with the rolling direction. However, this requirement cannot be completely fulfilled due to the shape and an operation efficiency of producing the iron cores as well as generation of a magnetic reluctance in the butted iron-core elements. Laser irradiation regions are formed, according to the present invention, for example, on the following: the parts of the iron core where the rotational magnetic field is generated; the entire surface of the I-type elements or: the major part of the E or C type element.

As a result of the laser-irradiation, the watt loss is low even where the complete coincidence of the easy direction of magnetization and the magnetic flux direction is difficult.

22 Claims, 18 Drawing Figures

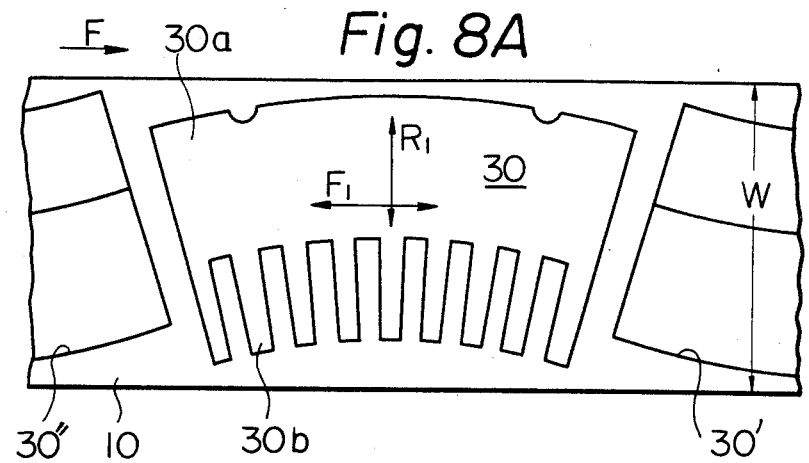
*Fig. 8A*
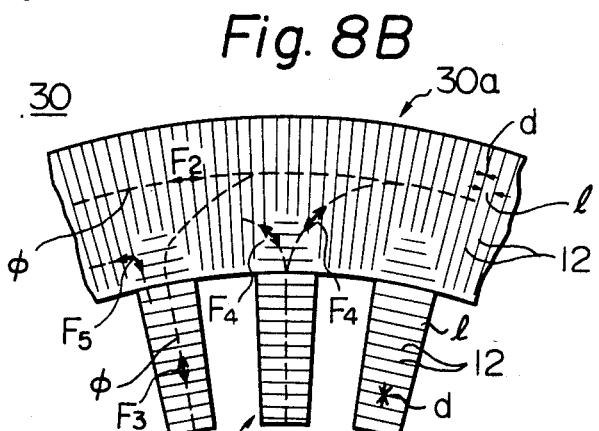
*Fig. 8B*
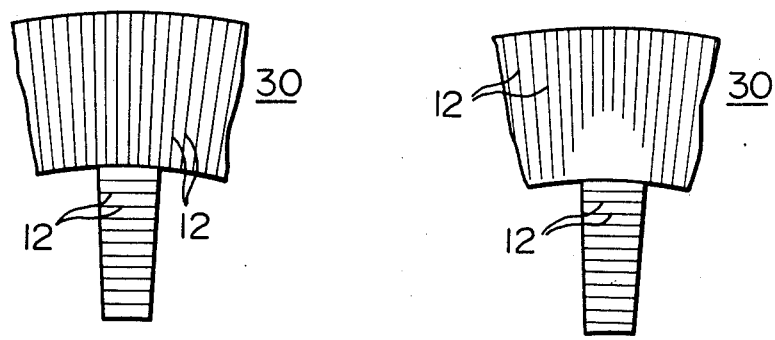
*Fig. 8C*  *Fig. 8D*

IRON CORE FOR ELECTRICAL MACHINERY AND APPARATUS AS WELL AS METHOD FOR PRODUCING THE IRON CORE

This application is a continuation of application Ser. No. 197,133, filed Oct. 15, 1980, now abandoned.

The present invention relates to an iron core for electrical machinery and apparatus as well as a method for producing the iron core.

The term "electrical machinery and apparatus" used herein collectively designates apparatuses having a magnetic circuit as a constitutional part, such as a transformer, a generator and an electric motor.

Usually, a grain-oriented electromagnetic steel sheet or a nonoriented electromagnetic steel sheet is used for the iron core of the electrical machinery and apparatus. The grain-oriented electromagnetic steel sheet is comprised of crystal grains which have a so called Goss texture and which have an (110)[001] orientation expressed by Miller index. This designation indicates that the (110) plane of the crystal grains are parallel to the sheet surface, while the [001] axis of the crystal grains, i.e. the direction of easy magnetization, is parallel to the rolling direction. Thus, the magnetic properties of the grain-oriented electromagnetic steel sheet are excellent in the rolling direction and is suddenly deteriorated with a deviation of angle from the rolling direction. The grain-oriented electromagnetic steel sheet is, therefore, cut or blanked in such a manner that the direction of the magnetic flux through the iron core of the electrical machinery and apparatus is coincident with the rolling direction.

The term "blank for the electrical machinery and apparatus" used herein indicates an electromagnetic steel sheet usually used for an already shaped form of the iron cores of the electrical machinery and apparatus, such as the iron core of transformers and the iron core of large and medium rotary machines.

It is also necessary in the construction of the iron core of transformers that the magnetizing direction of the iron core be coincident with the rolling direction of the grain-oriented electromagnetic steel sheet. However, such requirement in the transformer core cannot be completely fulfilled, because a laminated core is mostly used for large and medium transformers, so as to eliminate restrictions on the operation efficiency of manufacturing the transformer core. There are in the laminated core, portions in which the magnetizing direction deviates from the rolling direction, and such portions are not negligible, particularly in three-phase transformer, which will be explained by way of an example of a tripodic core-type transformer.

Referring to FIG. 1, an example of the laminating method in a well known three limb core is illustrated. The solid and broken lines of FIG. 1 indicate the uppermost layer and the next lower layer of the steel sheet laminates, respectively. When the lamination as shown in FIG. 1 is alternately repeated, the laminated core is completed. Around the three limbs A of the iron core the primary winding and the secondary winding for each phase of the three phase current are formed. At the joint between the outer two limbs A and the yokes B, where a so called 45° joint is formed, the direction of magnetization is essentially coincident with the rolling direction indicated by the arrows except for the regions between the line of the upper limb and yoke, and the connection line of the lower limb and yoke (that is, the regions between the adjacent solid and broken lines). Also the direction of magnetization is not coincident with the rolling direction at the direct proximity of the connection lines (the solid and broken lines). However, at T joints (indicated by the hatching in FIG. 2) formed at both ends of the central limb A, the rotational magnetic flux is generated, so that the watt loss in the T joints is considerably increased. The maximum watt loss in the T joints amounts to a level of from twice to three times the watt loss in the blank for the electrical machinery and apparatus, according to results from several experiments in thesises.

The present inventors measured the watt loss in several regions of a model transformer and an example of the measurement results is illustrated in FIG. 3. The curves denoted by numerals in FIG. 3 contours the relative watt loss of such numerals, in which 100 corresponds to the maximum watt loss in the T joints. As is apparent from FIG. 3, the watt loss is the highest at the central region of the T connection regions, where the watt loss is more than twice that of the limbs.

Table 1, below, illustrates the watt loss (a) at the legs, the maximum watt loss (b) at the T joints and the ratio of b/a with regard to the following three model transformers. Three transformers were produced by using nonoriented electromagnetic steel sheets, a conventional grain-oriented electromagnetic steel sheets, and a grain-oriented electromagnetic steel sheet with a high magnetic flux density, respectively. The watt loss values in Table 1 were measured at a frequency of 60 Hz and a magnetic flux density of 1.7 T except for 1.5 T with regard to the nonoriented electromagnetic steel sheet.

TABLE 1

| Material | Watt loss (a) at limbs (W/Kg) | Maximum watt loss (b) at T joints (W/Kg) | b/a |
|---|---|---|---|
| Nonoriented electromagnetic steel sheet | 1.99 | 3.34 | 1.68 |
| Conventional grain-oriented electromagnetic steel sheet | 1.72 | 3.44 | 2.00 |
| Grain-oriented electromagnetic steel sheet with a high magnetic flux density | 1.45 | 3.57 | 2.46 |

Table 1 illustrates that, at a higher degree of the crystal orientation the deterioration degree of the watt loss at the T joints is more serious.

The steel sheet sections have been shaped and arranged variously in the already proposed laminating methods so as to keep the watt loss at the T joints at a low level. The shape and arrangement of the steel sheet sections shown in FIG. 1 is considered to be the most effective laminating method at the present time. However, even in this laminating method, the deterioration of the watt loss at the T joints is notable when the magnetic properties of the grain-oriented electromagnetic steel is improved over the conventional grain-oriented electromagnetic steel.

The magnetic properties of the grain-oriented electromagnetic steel sheet are most effectively utilized for the transformer cores, when the transformers are of a wound core type. The laminated core mentioned above is, however, preferable in the light of the difficult winding operation of the wound core type. Since the CI type or EI type cores, include two sides perpendicular to each other, the axis of easy magnetization is directed along either side but not both sides. In order to avoid the easy magnetization direction only along either side, the C or E type members of the iron core must be constituted exclusively by the I type members. In this case, however, butted parts are formed between a number of the I type members and the inevitable clearance at the butted parts causes generation of a high magnetic reluctance.

Since the double oriented electromagnetic steel sheet cannot yet be mass-produced at low cost at the present stage, the grain-oriented electromagnetic steel sheet, which is adapted for the low cost mass production, should be used for the CI or EI type cores. Therefore, the inventors desired to develop such a treatment method of the blank for the electrical machinery and apparatus as being capable of enhancing the properties of the EI or CI type core to approximate those of the wound core.

The stator and rotor of the rotary machines are usually comprised of a laminated core which is manufactured by blanking a grain-oriented electromagnetic steel sheet into the core elements with a predetermined shape, laminating the core elements until a predetermined thickness is obtained, and then bundling the laminated core. Each iron core element of the rotor is annular and has a number of teeth around the outer circumference thereof, while each iron core element of the stator is annular and has a number of teeth around the inner circumference thereof. The magnetic flux radially passes through the teeth and circularly around the yoke of the iron core elements. The application of the grain-oriented electromagnetic steel to the iron core of the rotary machines involves one problem, that is, the magnetic flux does not pass in one direction but passes in any direction over 360°. The nonoriented electromagnetic steel sheet has, therefore, been usually used for the iron core of the rotary machines.

The dimension of these elements of the annular stator core of a large rotary machine, is too large for directly blanking the steel sheet. Each element is, therefore, divided into a plurality of fan-shaped elements, and these fan-shaped elements are blanked from the steel sheet, then assembled into an annular form and the assembled annular elements are laminated until the required thickness for the annular stator core is obtained. The manufacture described above is a current method which makes it possible to align the yoke or teeth substantially in the rolling direction and hence to use the grain-oriented electromagnetic steel sheet for the annular stator core.

This method of aligning either the teeth or yoke in the rolling direction, however, involves a difficulty, namely that the magnetic flux in the other teeth or yoke is directed in the [110] direction. Metallurgical means are primaries for removing such inconvenience, but the double oriented electromagnetic steel sheet, which has been developed to overcome the difficulty by metallurgical means, cannot yet be mass-produced at low cost, as explained above.

An object of the present invention is to provide an iron core of the electrical machinery and apparatus having a low watt loss, in a case where, because of the shape of the iron core, it is difficult to may be the direction of the magnetic flux coincident with the rolling direction of a grain-oriented electromagnetic steel sheet.

Another object of the present invention is to provide an iron core using a grain-oriented electromagnetic steel sheet, in which core the dependence of the watt loss on the direction of the magnetization is almost equivalent to the dependence in the double oriented or nonoriented electromagnetic steel sheet.

A further object of the present invention is to provide a method of reducing the watt loss by non metallurgical means but physical means.

A further object of the present invention is to provide such a method for producing the iron core so as to be capable of reducing the watt loss at parts of the iron core where the rotational magnetic flux is generated.

In accordance with the objects of the present invention, there is provided an iron core for electrical machinery and apparatus, such as a transformer, generator and electric motor, comprising at least one steel section which: has a predetermined form as elements of electrical machinery and apparatus; is made of a grain-oriented electromagnetic steel sheet, and; possesses marks of a laser-beam irradiation on the surface thereof.

There is also provided a method for producing an iron core of the electrical machinery and apparatus, comprising the steps of: shaping a grain-oriented electromagnetic steel sheet into steel sections having a predetermined form as elements of the iron core; irradiating, with or without the stress-relief annealing, (a) the parts of the steel sections, where the magnetic flux has to pass nearly parallel to the rolling direction, in such a manner that the laser-irradiation regions are substantially in the cross rolling direction, and (b) the parts of the steel sections, where the magnetic flux has to pass substantially perpendicular to the rolling direction, in such a manner that the laser-irradiation regions are substantially in the rolling direction. There is further proposed a method comprising the steps of: shaping a grain-oriented electromagnetic steel sheet into steel sections having a predetermined form as elements of the iron core, and; irradiating a part or parts of the steel sections, where a rotational magnetic flux is generated, by a laser beam.

The term of "laser-irradiation regions" used above and below indicates the parts of the steel-sheet sections which have been irradiated with the laser beam and on which parts the laser-beam irradiation marks are formed.

The perpendicular direction to the rolling direction is herein referred to as the cross rolling direction.

The present invention will be explained in detail hereinbelow.

FIGS. 8A through 8D illustrate an outline of irradiation with the laser beam the stator core of a large rotary machine.

Figure 4A:
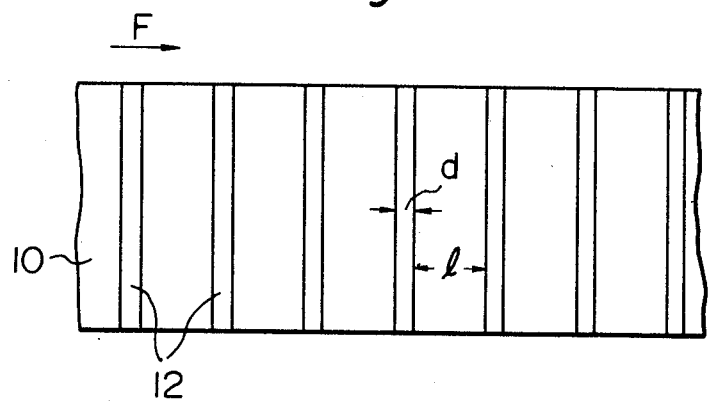
FIGS. 4A, 4B and 4C illustrate an outline of the laser beam irradiation.

As described hereinabove, the grain-oriented electromagnetic steel sheet has a (110)[001] texture and is easily magnetized in the rolling direction. Referring to FIG. 4A, the grain-oriented electromagnetic steel sheet 10 is irradiated with a laser beam substantially perpendicular to the rolling direction F. The reference numeral 12 indicates the laser-irradiation regions of the steel sheet in the form of rows. The fact that the watt loss is reduced by the laser-beam irradiation can be explained as follows.

Figure 5A:
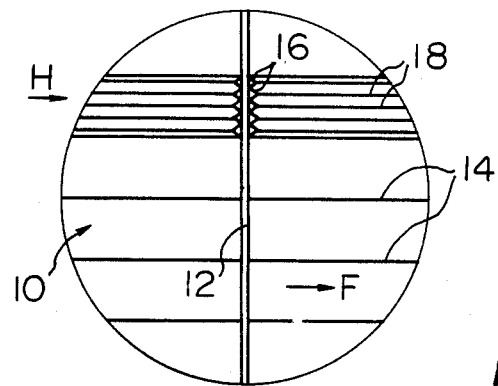
FIGS. 5A and 5B illustrate a reason for the watt loss reduction.

The grain-oriented electromagnetic steel sheet 10 possesses a relatively large magnetic domains 14 which is elongated in the rolling direction as illustrated in FIG. 5A. With a higher degree of (110)[001] texture the crystal grains, through which the domain walls extend, and thus the magnetic domains bounded by the domain walls are caused to be larger in the grain-oriented electromagnetic steel. Since the watt loss is proportional to the size of the magnetic domains, a problem of inconsistency resides in the fact that the material, which has a higher degree of texture and thus larger grains, does not display the watt loss which is reduced proportionally to the higher degree of crystal texture.

When the grain-oriented electromagnetic steel sheet is irradiated with a laser beam substantially in the cross rolling direction, so as to extend the laser-irradiation regions 12 substantially in the cross rolling direction, a group of small projections 16 are generated along both sides of the laser-irradiation regions 12. A scanning type electron microscope can detect the small projections, which extend along both sides of the laser-irradiation regions 12, but which are only partly shown in FIGS. 5A and 5B. The small projections would be nuclei of magnetic domains, having 180° domain walls causing the magnetic domains 14 of the grain-oriented electromagnetic steel sheet 10 to be subdivided when the steel sheet 10 is magnetized. As a result of the subdivision of the magnetic domains the watt loss is reduced. It is believed that, when the steel sheet is irradiated by a high power laser, strong elastic and plastic waves are generated in the steel sheet. Probability of generation of the nuclei is believed to be proportional to a density of dislocations which are generated by the plastic waves.

Figure 4B:
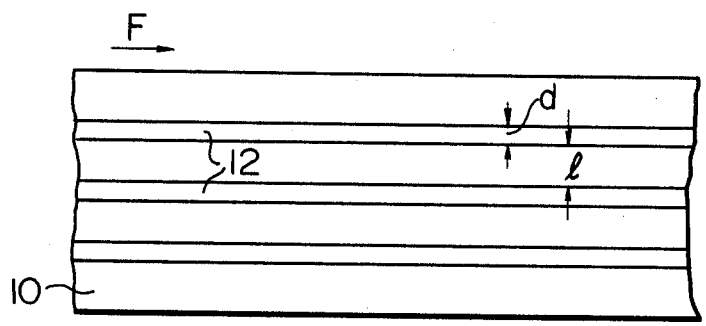
Figure 5B:
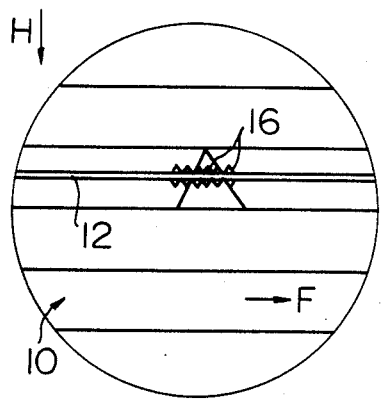

Referring to FIG. 4B, the grain-oriented electromagnetic steel sheet 10 is irradiated with a laser beam in the rolling direction F. As a result of the irradiation, the laser-beam irradiation marks are arranged in the rolling direction. Referring to FIG. 5B, a group of small projections 16 generated by the laser-beam irradiation are illustrated. The small projections 16 seem to function as nuclei of magnetic domains (not shown) having 90° domain walls. Namely when the external magnetic field H is applied to the steel sheet 10, the 90° domain walls seem to develop from the small projections 16 which cause the formation of minute magnetic domains (not shown) aligned parallel in the direction of the external magnetic field, and which thus lead to the reduction of the watt loss.

In an example of the laser-beam irradiation illustrated in FIG. 4A, the watt loss $W_L$ (rolling direction) of 1.10 W/kg measured at a magnetic flux density of 1.7 T and a frequency of 50 Hz was reduced after laser-beam irradiation to 1.00 W/kg. The watt loss (WC) in the cross rolling direction measured at a magnetic flux density of 1.3 T and a frequency of 50 Hz was not essentially changed by the laser-beam irradiation. Therefore, the watt loss ($W_L$) was reduced by 10% due to the laser-beam irradiation illustrated in FIG. 4A. On the other hand, in the laser-beam irradiation illustrated in FIG. 4B, the watt loss ($W_L$) was not appreciably changed but the watt loss ($W_C$) was reduced to 2.04 W/kg. The watt loss ($W_C$) was, therefore, drastically reduced as much as 28%.

Figure 4C:
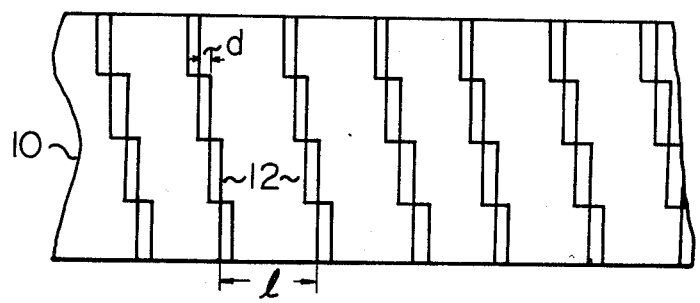

In FIGS. 4A and 4B the steel sheet is irradiated with a laser-beam along a short or long side thereof in the form of parallel rows or straight lines. However, the traces of the laser-beam may be in a zigzag or step form along the short or long side of the steel sheet as illustrated in FIG. 4C.

Conditions for achieving such watt loss reduction as explained above are as follows. The irradiation width (d) of the laser-irradiation regions 12 should be from 0.01 to 1 mm, the gap (l) of the laser-irradiation regions 12 should be from 1 to 20 mm, and the laser-pulse should be from 1nS to 1mS, in the irradiation method of FIG. 4A. In the irradiation method of FIG. 4B, the conditions should be such that: the irradiation width (d)=0.01 to 1 mm; the gap (l)=1.0 to 30 mm; a laser-pulse width of not more than 10 mS, and; energy density (P)=0.5 to 5 J/cm². The energy density (P) of the laser beam has a relationship with a dislocation density ($\rho$), which can be expressed by:

$$\pi^{1/n} \alpha P,$$

wherein "n" is constant. When regions with a high dislocation density are formed by the laser-beam irradiation, the magnetic domains of these regions may be disordered in such a manner that the watt loss is increased. Therefore, the watt loss reduction is the highest at certain optimum values of d, l and P, that is, the watt loss reduction is the most notable at approximately 0.4 of d·P²/l and the watt loss is inconveniently high at a great deviation of d·P²/l higher or lower than 0.4. Laser to be used is preferably a pulse laser. A continuous-wave laser may be used but a pulse laser is more effective than the continuouswove laser irradiation. The laser-irradiation regions 12 of FIGS. 4A and 4B may not be precisely aligned in a direction perpendicular and parallel to the rolling direction F, respectively, but no appreciable difference in the effects of laser-beam irradiation is caused by deviation from such directions in the range of ±30°. The steel sections may be subjected to the application of a known insulating film after laser-beam irradiation.

Figure 1:
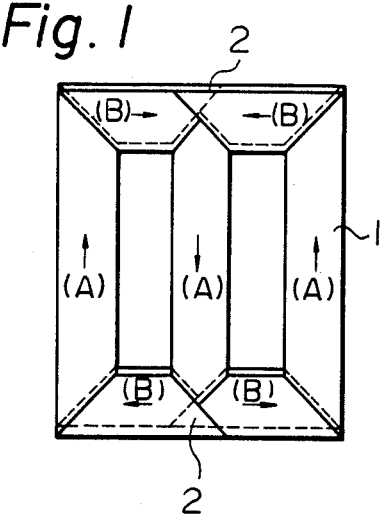
FIG. 1 illustrates a laminating method for the manufacture of a transformer core, which is considered at present to be most effective for the watt loss reduction. The arrows in FIG. 1 indicate the rolling direction of the steel sheet of the blank.
Figure 2:
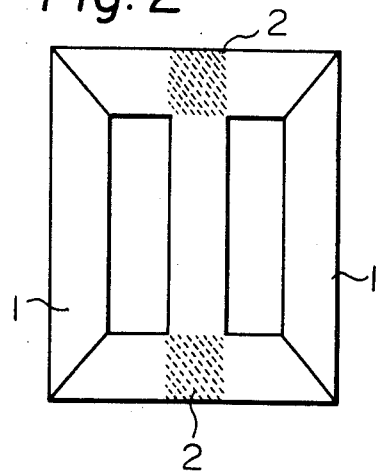
FIG. 2 illustrates T joints of a transformer core, which are indicated by the dotted hatching.

In a method which comprises the steps of: blanking an electromagnetic steel sheet so as to assemble a transformer core from the blanked sections, and; as blanked or subsequent to the blanking, stress-relief annealing the electromagnetic steel sheet, an improvement according to the present invention comprises preparatory irradiating with a laser-beam the parts 2 (FIGS. 1 and 2) of the sections of the electromagnetic steel sheet, where a rotational magnetic flux is generated under an alternating excitation. Either or both surfaces of the steel sections, where the rotational magnetic flux is to be generated, are scanned with a laser-beam substantially parallel to the rolling direction. The laser irradiation must not be necessarily continuous and therefore may be intermittent. A ruby laser, a YAG laser or a nitrogen laser, which are commercially available at present, can be used for the laser-beam irradiation. The energy density (P) of the lasers is appropriately from 0.01 to 1000 J/cm$^2$. The pulse width (oscillation time) is desirably not longer than 10 mS, because thermal melting phenomenon prevails on the surface of the steel sections when the pulse width exceeds 10 mS. Appropriately, the irradiation width (d) and the gap (l) of the laser-irradition regions are from 0.01 to 1 mm and from 1.0 to 30 mm, respectively.

Figure 6:
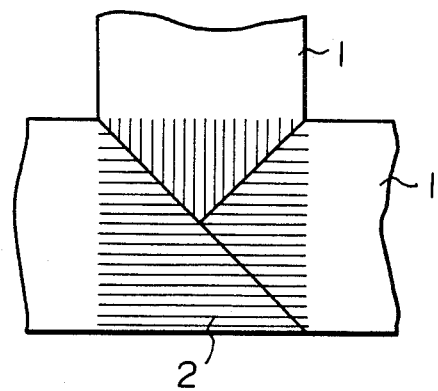
FIG. 6 illustrates a trace of the laser beam irradiation at the T joint of a transformer core.

According to a preferable embodiment illustrated in FIG. 6, one end of the sections of a grain-oriented electromagnetic steel sheet is chamfered at 45°, the chamfered three steel sections are connected by a so called 45° joint so as to form a T joint, and the rows of the laser-beam irradiation marks are arranged on the T joint, in the form of a stripe extending substantially parallel to the rolling direction. The T connecting region is irradiated with a laser-beam, prior to the chamfering or the 45° joint, so as to form the stripe irradiation regions.

In a case where the constitutional elements of an iron core made of a grain-oriented electromagnetic steel sheet comprises a first part extending in the rolling direction and a second part extending in the cross rolling direction, a preferable embodiment on the present invention comprises scanning the first part in a first direction, which is substantially perpendicular or parallel to the rolling direction, and scanning the second part in a second direction which is substantially perpendicular to the first direction. With regard to the EI or CI type cores of a transformer or the like, the elements of the iron core made of a grain-oriented electromagnetic steel sheet are irradiated with a laser beam as illustrated in FIG. 7.

The I type elements 20 (FIG. 7A) are blanked from the grain-oriented electromagnetic steel sheet in such a manner that the longitudinal direction of these elements is in the rolling direction of the steel sheet. The laser-irradiation regions 12 are directed along the short sides of the I type elements 20 which are made of a grain-oriented electromagnetic steel sheet. The laser-irradiation regions 12 may be formed by successively deflecting or scanning a laser beam. Alternately, a strip form laser-beam having the same configuration as the regions 12 may be generated by means of a slit of a mask for the laser-beam. By using a mask a plurality of the laser-irradiation regions may be simultaneously formed. Since the magnetic flux ($\phi$) passes through the I type elements 20 in the direction indicated by a broken line, the watt loss can be reduced because of the reason explained in reference to FIG. 4A.

The E type elements 22 (FIG. 7A) are formed in such a manner that the longitudinal directions of the three limbs 22a and the yoke 22b are directed in the rolling direction (F) and the cross rolling direction, respectively, or vice versa. The laser-irradiation regions 12 of the three limbs 22a and the yoke are directed along the short sides of the limbs and yoke, respectively. As a result of extending the laser-irradiation regions as stated above, the watt loss is reduced at the three limbs 22a because of the reason explained in reference to FIG. 4A, while the watt loss is also reduced at the yoke 22b because of the reason explained in reference to FIG. 4B.

Figure 7A:
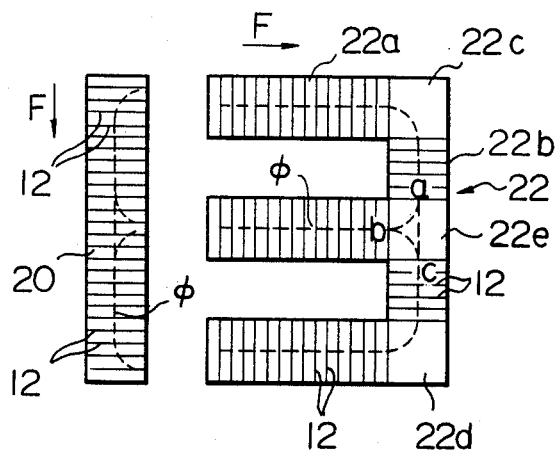
FIGS. 7A through 7D illustrate an outline of irradiation with the laser beam the EI or CI type core elements.
Figure 7B:
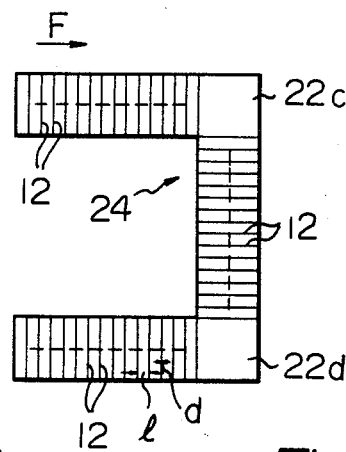

Referring to FIG. 7B, a C type element 24 of the core is illustrated and the watt loss of the C type element 24 is reduced by a method similar to that in FIG. 7A.

Figure 7C:
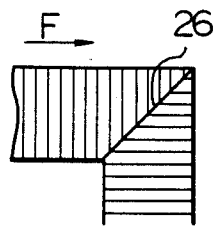

The laser-beam irradiation regions are formed on the E or C type elements except for the corners thereof. But the laser-beam irradiation regions, which are aligned to those on the limbs and yoke, can be formed on the selected parts of corners of the E or C type elements. Although the corners 22c and 22d are not irradiated for the sake of simplicity of the method, the watt loss reduction is satisfactorily. The laser beam applied to the limbs and yoke may, however, be consecutively applied to each half part of the corners 22c and 22d divided by the diagonal line 26 (FIG. 7C).

Figure 7D:
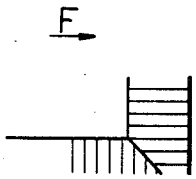

When the E and I type cores are used for the iron core of a three-phase transformer, the magnetic flux passing through the T joint 22e is directed into six directions, namely a→b, b→c, c→a and vice versa. Therefore, the T joint 22e is preferably nonoriented. However, when the T joint 22e is made of a grain-oriented electromagnetic steel sheet, the T joint 22e may be left non-irradiated as shown in FIG. 7A. Alternately, the laser beam applied to the yoke and the central limb may be consecutively applied to the T joint 22e, as illustrated in FIG. 7D, in such a manner that the laser-beam stripe in the rolling and cross-rolling directions are selectively formed.

The watt loss of the CI and EI type cores made of a grain-oriented electromagnetic steel sheet can be reduced by a laser irrdiation, which is a simple means, as described above. As is well known, some of the electric power is uninterruptedly lost as a watt loss during the operation of the transformers, and even a slight reduction of the watt loss greatly contributes to a power saving over the life of the transformers. The present invention is, therefore, very effective for power saving in the operation of the transformers.

When a grain-oriented electromagnetic steel sheet is used as the stator of large, electrical machinery and apparatus, the watt loss can be reduced in the stator core which comprises: a plurality of fan-shaped elements blanked from a grain-oriented electromagnetic steel sheet, in such a manner that the longitudinal direction of the fan-shaped elements is coincident with the rolling direction or the cross rolling direction, and; the laser-irradiation regions of the yoke and teeth, which regions have a predetermined width, extend in an essentially radial direction of the fan shape and in an essentially circumferential direction, respectively, and further laser-irradiation regions are spaced from each other, by a predetermined gap, radially and circumferentially with regard to such regions of the teeth and yoke, respectively. The method for producing the stator core comprises the steps of blanking, with or without stress-relief annealing, and laser irradiating.

Referring to FIG. 8A, an outline of a blanking method of a grain-oriented electromagnetic steel sheet 10 into fan-shaped elements 30 of a stator core is illustrated. Each fan-shaped element 30 has a yoke 30a and teeth 30b. The grain-oriented electromagnetic steel sheet 10 has been rolled in the direction F(rolling direction) and has a width (W) of approximately 1 m. The neighbouring fan-shaped elements 30' and 30" are cut off from the steel sheet 10 in directions opposite to each other so as to reduce the amount of waste. The longitudinal direction $F_1$, namely the direction perpendicular to the radial direction $R_1$ at the center of each fan-shaped element 30, is coincident with the rolling direction F of the steel sheet 10.

Referring to FIG. 8B, the magnetic flux ($\phi$) passing through each fan-shaped element 30 is directed, as shown by the broken lines, in a circumferential direction ($F_2$) at the yoke, in a radial direction ($F_3$) at the teeth and in arcuate directions (F$_4$) connecting the direction F$_2$ with F$_3$ at the border between the yoke and teeth.

Whether the magnetic flux passes right or left along the arcuate directions (F$_4$) it is determined by the phase of a three-phase exciting current at a given moment. Therefore, when the direction of the magnetic flux is coincident with the rolling direction at the center of each fan-shaped element 30, the direction of magnetic flux is deviated from the rolling direction, i.e. the easily magnetizable [001] axis, at the right and left ends of the fan-shaped element, with regard to the yoke of the fan-shaped element. The deviation angle depends on the number of elements the stator core divided into and the angle is usually from 20° to 30°. With regard to the teeth 30b, when the longitudinal direction F of each fan-shaped element is coincident with the rolling direction, the magnetic flux through the central tooth and the right or left tooth is directed in toward the cross rolling direction and in a direction deviated from the cross rolling direction. The deviation angle is from 20° to 30°. Deviation of the magnetic flux direction from the crystal orientation exerts a great influence on the watt loss, which can be comprehended from the fact that a drastic watt loss reduction can be achieved by increasing the degree of (110)[001] texture in the rolling direction of a grain-oriented electromagnetic steel sheet. The deviation angle of 20° to 30° is therefore not negligible in the light of watt loss. More serious than such deviation is the deviation at the teeth, where the magnetic flux passes along the [110] axis, which is perpendicular to the [001] axis and which is difficult to magnetize. Thus a grain-oriented electromagnetic steel sheet has therefore not been used for the iron core of large rotary machines.

The stripe pattern shown in FIG. 8B and formed by a laser irradiation makes it possible to employ a grain-oriented electromagnetic steel sheet as the fan-shaped blanked elements of a stator core of large rotary machines. The laser-irradiation regions 12 of the yoke 30a of each fan-shaped element 30 have a predetermined width (d), radially extend and are circumferentially arranged and spaced from each other by a predetermined gap (l). The irradiation method illustrated in FIG. 4A is modified and utilized for the formation of such laser-irradiation regions 12. On the other hand, the laser-irradiation regions 12 of the teeth 30b have a predetermined width (d), circumferentially extend, and are radially arranged and spaced from each other at a predetermined gap (l). The irradiation method illustrated in FIG. 4B is modified and utlized for the formation of the laser-irradiation regions on the teeth.

When the irradiation methods illustrated in FIGS. 4A and 4B are utilized without modification to the formation of the laser-irradiation regions of each fan-shaped element, the whole laser-irradiation regions 12 extend parallel to the direction R$_1$, namely the radial direction of the fan-shaped element at the center, with the result that the direction of the laser-irradiation regions of right and left ends of the fan-shaped element is deviated from such direction shown in FIG. 8B. The deviation angle can be from 20° to 30°. Similarly, the whole laser-irradiation regions of the teeth extend perpendicular to the direction R$_1$, namely parallel to the longitudinal direction F$_1$, with the result that the direction of the laser-irradiation regions of the right and left columns is deviated from such direction shown in FIG. 8 by an angle of from 20° to 30°.

The deviation angle from the rolling direction in the range of 20° to 30° is permissible because of a slight degree of deviation in the fan shaped elements. The deviation angle of from 20° to 30° would be preferable rather than permissible, because due to such angle deviation the magnetic flux deviation from the rolling direction becomes small.

Figure 3:
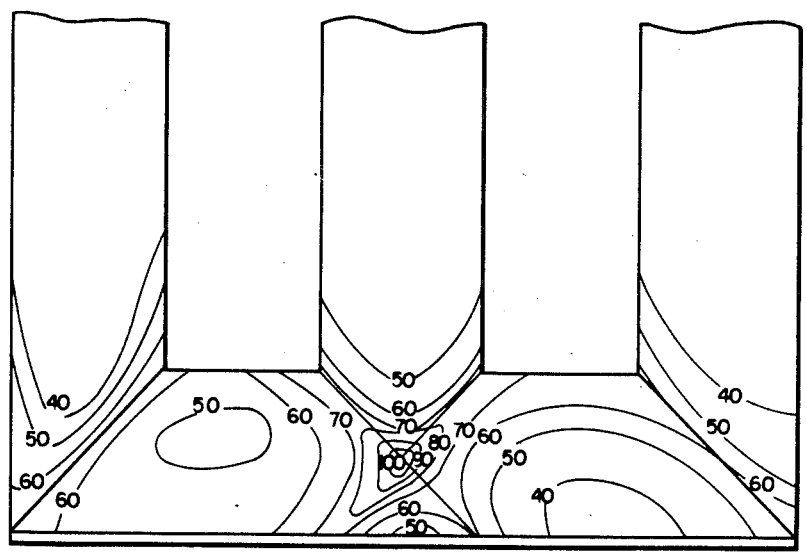
FIG. 3 illustrates the distribution of the watt loss in a three-phase model transformer by coutour lines. The watt loss is denoted by a relative value on the premise that the highest watt loss is 100.

The border between the teeth 20b and the yoke 20a may be irradiated by one of the following methods. Referring to FIG. 8B, the laser-irradiation pattern on the border is tapered as compared with the pattern on the teeth, with the result that the magnetic flux is guided as shown by the broken line F$_5$ (the border between the yoke and left tooth). The watt loss reduction can be achieved because of the reasons explained in reference to FIGS. 3 and 4. Referring to FIG. 8C, the laser-beam irradiation is applied to the border as it has been applied to the yoke. Referring to FIG. 8D, the laser-beam irradiation is not applied to the border. This irradiation is permissible, because the border area is relatively small and further the magnetic flux is directed at the border into various directions. As explained above in reference to FIGS. 8B, 8C and 8D, the present invention makes it possible to reduce the watt loss of both yoke and teeth regions of the stator-core element of a rotary machine, which core is divided into sections made of a grain-oriented electromagnetic steel sheet.

The laser-irradiation regions 12 of the drawings explained above are shown as continuous lines. The watt loss of a grain-oriented electromagnetic steel sheet can be reduced by the laser-beam irradiation which leaves linear marks on the steel sheet. In addition, the watt loss reduction can be achieved by the laser-beam irradiation marks in the form of broken lines or spots. When the laser-beam irradiation marks are spots and/or broken lines arranged in rows, laser-beam is applied on the blank of an electrical machinery and apparatus preferably under the following conditions: energy density of from 0.001 to 1000 J/cm$^2$; the area of each laser-beam irradiation mark of not lower than 10$^{-5}$ mm$^2$.

Embodiments of the present invention applied to the stator-core elements, on which intermittent spots are formed, are illustrated hereinafter.

Figure 9:
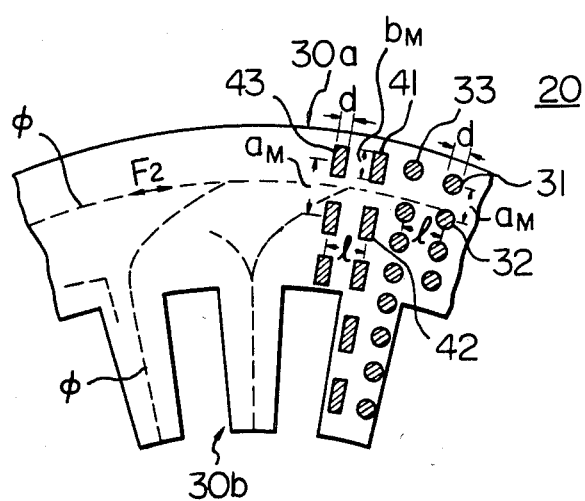
FIG. 9 illustrates an outline of irradiating the fan-shaped core elements of the split stator cores.

Referring to FIG. 9, in which a stator-core element similar to that of FIG. 8 is illustrated, the spot marks 31, 32 and 33 schematically shown are formed by the laser-beam irradiation according to an embodiment of the present invention so as to utilize a grain-oriented electromagnetic steel sheet for a rotary machine. The same reference numerals and symbols in FIG. 9 as those of FIG. 8 are of the identical meaning. An example of the irradiation conditions is as follows.

Area of each mark (s): not less than 10$^{-5}$ mm$^2$.
Mark diameter (d): 0.004–1 mm.
Distanoe (a$_M$) of marks in the cross rolling.
direction: 0.004–2 mm.
Distance (l) of marks in the rolling direction: 1–30 mm.
Energy density of laser beam (P): 0.01–1000 J/cm$^2$.

In another embodiment of the present invention the broken-line marks 41, 42 and 43 are formed by laser-beam irradiation. An example of the irradiation conditions is as follows.

Mark width (d): 0.03–1 mm.
Mark length (b$_M$): not less than 1 mm.
Distance (a$_M$): 0.01–2 mm.
Distance (l): 1–30 mm
Energy density (P): 0.01–1000 J/cm$^2$.
Pulse width (Oscillation time): 1 ns–100 mS.

Either spot marks or the broken-line marks formed by irradiation according to the two embodiments of the present invention described above are given on a surface portion of one blank for electrical machinery and apparatus, but both may be given in combination on a surface portion of the blank. The present invention further includes in its scope an embodiment, in which an optional combination of the marks is given on both surfaces of one blank for electrical machinery and apparatus. The laser-beam irradiation according to the present invention is preferably applied to the blank after the known stress-relief annealing which is carried out, if necessary, to remove the stress induced in the coil at the blanking of a steel strip.

The following Example illustrate methods of the present invention and demonstrates preferable irradiation-conditions which cause a notable watt-loss reduction.

EXAMPLE 1

A grain-oriented electromagnetic steel sheet having magnetic properties of $B_8 = 1.92T$ and $W_{17/60} = 1.36$ W/kg was blanked to form the steel-sheet sections for a transformer core, and then stress-relief annealed. A YAG laser beam was applied to the steel-sheet sections in such a manner that the laser beam was scanned substantially parallel to the rolling direction of each steel-sheet section, which constitutes a T joint so as to form the laser-irradiation regions having a stripe-form. FIG. 6 schematically illustrates how the laser-beam was scanned or traced on the T joint of the steel-sheet sections. The laser beam was applied on only one surface of the steel-sheet sections and the irradiation conditions were as follows.

Pulse width (oscillation time): 150 nS.
Irradiation width d (FIGS. 4A and 4B): 0.16 mm.
Irradiation distance l (FIGS. 4A and 4B): 5 mm.
Irradiation energy density P: 1.3 J/cm².

The watt loss was measured before and after the irradiation and found to be as follows.
Before irradiation $W_{17/60} = 1.57$ W/kg.
After irradiation $W_{17/60} = 1.52$ W/kg.

The symbol of $W_{17/60}$ indicates watt loss at a magnetic flux of 1.7T and frequency of 60Hz.

Reduction rate of the watt loss of a transformer core due to the laser irradiation was, therefore, $$\frac{1.57 - 1.52}{1.57} \times 100\% = 3.2\%$$

At the T joint, which amounts to 9.5% of the weight of the iron core, the watt-loss reduction ratio was $$\frac{3.2(\%)}{9.5(\%)} \times 100(\%) = 33.7\%$$

EXAMPLE 2

The element of a stator core were blanked from a grain-oriented electromagnetic steel sheet, which had been final-annealed, using blanking dies and the elements were subjected to a laser-beam irradiation under the following conditions of; energy density (P) 1.1 J/cm², and; mark diameter (d) 0.1 mm.

The spot marks 32 illustrated in FIG. 9 and having a mark diameter (d) of 0.1 mm were formed by irradiation under the $a_M$ and l parameters given in Table 2.

TABLE 2

| Samples | $a_M$ (mm) | l (mm) | Watt loss before irradiation $W_{17/50}$ | | Watt loss after irradiation $W_{17/50}$ | | Magnetic flux before irradiation $B_{10}$ | | Magnetic flux after irradiation $B_{10}$ | |
|---|---|---|---|---|---|---|---|---|---|---|
| | | | L direction | C direction | L direction | C direction | L direction | C direction | L direction | C direction |
| A | 0.5 | 1.0 | 1.65 | 4.18 | 1.58 | 4.17 | 1.80 | 1.36 | 1.80 | 1.37 |
| B | 5 | 0.5 | 1.63 | 4.20 | 1.61 | 3.98 | 1.82 | 1.36 | 1.81 | 1.36 |

The L and C directions indicate the measuring directions of the magnetic properties in the rolling direction and cross rolling direction (the direction perpendicular to the rolling direction). The scanning directions of the laser in Samples A and B were the C and L directions, respectively.

As is apparent from Table 2, the watt loss of Sample A in the L direction was reduced by 0.07 W/kg and the watt loss of Sample B in the C direction was reduced by 0.22 W/kg, due to the laser-beam irradiation in the form of spots.

EXAMPLE 3

A linear irradiation such as illustrated in FIG. 9 (marks 43) was carried out under the conditions of: energy density (P) of 1.1 J/cm²; irradiation width (d) of 0.05 mm, and; irradiation length ($b_M$) of 0.3 mm. The results of irradiation as well as the irradiation parameters $a_M$ and are given in Table 3. The scanning directions of the laser in Samples C and D were the C and L directions, respectively.

TABLE 3

| Samples | $a_M$ (mm) | l (mm) | Watt loss before irradiation $W_{17/50}$ | | Watt loss after irradiation $W_{17/50}$ | | Magnetic flux before irradiation $B_{10}$ | | Magnetic flux after irradiation $B_{10}$ | |
|---|---|---|---|---|---|---|---|---|---|---|
| | | | L direction | C direction | L direction | C direction | L direction | C direction | L direction | C direction |
| C | 0.5 | 7.5 | 1.69 | 4.10 | 1.61 | 4.10 | 1.79 | 1.38 | 1.78 | 1.38 |
| D | 5.0 | 0.8 | 1.65 | 4.15 | 1.64 | 3.92 | 1.81 | 1.36 | 1.80 | 1.35 |

As being apparent from Table 2, the watt loss of Sample C in the L direction was reduced by 0.08 W/kg and the watt loss of Sample D in the C direction was reduced by 0.22 W/kg, due to the linear laser-beam irradiation.

EXAMPLE 4

Spot irradiation was applied on both surfaces of steel-sheet sections under the conditions of: energy density (P) of 1.1 J/cm$^2$; the mark diameter (d) of 0.1 mm, and; the irradiation parameters $a_M$ and l given in Table 4.

TABLE 4

| Samples | $a_M$ (mm) | l (mm) | Watt loss before irradiation $W_{17/50}$ | | Watt loss after irradiation $W_{17/50}$ | | Magnetic flux before irradiation $B_{10}$ | | Magnetic flux after irradiation $B_{10}$ | |
|---|---|---|---|---|---|---|---|---|---|---|
| | | | L direction | C direction | L direction | C direction | L direction | C direction | L direction | C direction |
| E | (Front surface) 0.5 (Back surface) 5 | 10 0.5 | 1.66 | 4.16 | 1.59 | 3.95 | 1.80 | 1.37 | 1.80 | 1.36 |

The parameters $a_M$ and l on both surfaces of a steel-sheet section are different from each other as shown in Table 4. Due to the spot irradiation, in which the parameters $a_M$ and l on one surface are different from the other, the watt losses in the L and C directions were reduced by 0.07 W/kg and 0.21 W/kg, respectively.

We claim:

1. An AC electrical apparatus magnetic core lamination component comprising:
    at least a first and a second magnetic portion angularly interrelated with each other in series so as to jointly conduct an AC magnetic flux in their respective longitudinal directions and which are integrally blanked from a (110)[001] crystal grain-oriented electromagnetic steel sheet;
    said first magnetic portion having said longitudinal direction generally parallel to the direction of the [001] axis of the crystal grains and having patterns of marks of laser beam irradiation thereon only generally perpendicular to said direction of the [001] axis of the crystal grains for conducting said megnetic flux generally parallel to said direction of the [001] axis of the crystal grains; and
    said second magnetic portion having said longitudinal direction generally perpendicular to the direction of the [001] axis of the crystal grains and having patterns of marks of laser beam irradiation thereon only generally parallel to said direction of the [001] axis of the crystal grains for conducting said magnetic flux generally perpendicular to said direction of the [001] axis of the crystal grains.

2. An iron core according to claim 1, wherein said laser-beam irradiation marks are in the form of continuous lines arranged in rows at a predetermined gap.

3. An iron core according to claim 1, wherein said laser-beam irradiation marks are in the form of at least one of spots and broken lines arranged in rows, the area of each laser-beam irradiation mark being not lower than 10$^{-5}$ mm$^2$, and the energy density of the laser-beam being from 0.01 to 1000 J/cm$^2$.

4. An AC electrical apparatus magnetic core lamination component as recited in claim 1 wherein:
    said marks of laser beam irradiation on said first magnetic portion are in the form of spaced apart rows substantially perpendicular to said direction of the [001] axis of the crystal grains; and
    said marks of laser beam irradiation on said second magnetic portion are in the form of spaced apart rows substantially parallel to said direction of the [001] axis of the crystal grains.

5. An AC electrical apparatus magnetic core lamination component as recited in claim 1 which comprises an E type element having an elongated yoke and three limbs extending from said yoke wherein:
    said limbs are formed from said first magnetic portion; and
    said yoke is formed from said second magnetic portion.

6. An AC electrical apparatus magnetic core lamination component as recited in claim 1 which comprises an E type element having an elongated yoke and three limbs extending from said yoke wherein:
    said limbs are formed from said second magnetic portion; and
    said yoke is formed from said first magnetic portion.

7. An AC electrical apparatus magnetic core lamination component as recited in claim 5 wherein said laser beam irradiation marks are present on said E type element except at the region of intersection of said limbs with said yoke.

8. An AC electrical apparatus magnetic core lamination component as recited in claim 7 wherein said laser beam irradiation marks extend into said region of intersection without overlapping.

9. An AC electrical apparatus magnetic core lamination component as recited in claim 1 which comprises a C type element having an elongated yoke and two limbs extending from said yoke wherein:
    said limbs are formed from said first magnetic portion; and
    said yoke is formed from said second magnetic portion.

10. An AC electrical apparatus magnetic core lamination component as recited in claim 1 which comprises a C type element having an elongated yoke and two limbs extending from said yoke wherein:
    said limbs are formed from said second magnetic portion; and
    said yoke is formed from said first magnetic portion.

11. An AC electrical apparatus magnetic core lamination component as recited in claim 9 wherein said laser beam irradiation marks are present on said C type element except at the region of intersection of said limbs with said yoke.

12. An AC electrical apparatus magnetic core lamination component as recited in claim 11 wherein said laser beam irradiation marks extend into said region of intersection without overlapping.

13. An AC electrical apparatus magnetic core lamination component as recited in claim 1 which comprises a fan shaped element for use as a portion of a stator core, said fan shaped element including a circumferential yoke and teeth radially extending from said yoke, wherein:

said yoke is formed from said first magnetic portion; and said teeth are formed from said second magnetic portion.

14. An AC electrical apparatus magnetic core lamination component as recited in claim 1 which comprises a fan shaped element for use as a portion of a stator core, said fan shaped element including a circumferential yoke and teeth radially extending from said yoke, wherein:

said yoke is formed from said second magnetic portion; and said teeth are formed from said first magnetic portion.

15. An AC electrical apparatus magnetic core lamination component as recited in claim 13 wherein the regions of said yoke immediately adjacent to said teeth are formed from said second magnetic portion.

16. An AC electrical apparatus magnetic core lamination component as recited in claim 14 wherein the regions of said yoke immediately adjacent to said teeth are formed from said first magnetic portion.

17. An AC electrical apparatus magnetic core lamination component as recited in claim 13 wherein:

said marks of laser beam irradiation on said first magnetic portion extend in essentially the radial direction in predetermined spaced apart rows; and said mark of laser beam irradiation on said second magnetic portion extend in essentially the circumferential direction in predetermined spaced apart rows.

18. An AC electrical apparatus magnetic core lamination component as recited in claim 14 wherein:

said marks of laser beam irradiation on said second magnetic portion extend in essentially the circumferential direction in predetermined spaced apart rows; and said marks of laser beam irradiation on said first magnetic portion extend essentially in the radial direction in predetermined spaced apart rows.

19. An AC electrical apparatus magnetic core lamination component as recited in claim 6 wherein said laser beam irradiation marks are present on said E type element except at the region of intersection of said limbs with said yoke.

20. An AC electrical apparatus magnetic core lamination component as recited in claim 19 wherein said laser beam irradiation marks extend into said region of intersection without overlapping.

21. An AC electrical apparatus magnetic core lamination component as recited in claim 10 wherein said laser beam irradiation marks are present on said C type element except at the region of intersection of said limbs with said yoke.

22. An AC electrical apparatus magnetic core lamination component as recited in claim 21 wherein said laser beam irradiation marks extend into said region of intersection without overlapping.

* * * * *

UNITED STATES PATENT AND TRADEMARK OFFICE
CERTIFICATE OF CORRECTION

PATENT NO. : 4,613,842                          Page 1 of 3

DATED       : September 23, 1986

INVENTOR(S) : T. Ichiyama, et al.

It is certified that error appears in the above-identified patent and that said Letters Patent is hereby corrected as shown below:

ABSTRACT, line 1, omit "an" between "of" and "electrical".

ABSTRACT, line 10, omit "an" before "operation".

Column 1, line 51, change "transformer," to --transformers,--.

Column 2, line 12, change "thesises" to --thesis--.

Column 2, line 27, change "sheets" to --sheet--.

Column 3, line 63, change "may be" to --make--.

Column 4, lines 6 and 7, change "by non-metalurgical means but" to --not by metallurgical means but by--.

Column 4, line 57, change "coutour" to --contout--.

Column 4, line 67, insert --of-- between "beam" and "the".

Column 5, line 2, change "beam the" to --beam of the--.

UNITED STATES PATENT AND TRADEMARK OFFICE
CERTIFICATE OF CORRECTION

PATENT NO. : 4,613,842

DATED : September 23, 1986

INVENTOR(S) : T. Ichiyama, et al.

It is certified that error appears in the above-identified patent and that said Letters Patent is hereby corrected as shown below:

Column 5, line 17, omit the word "a".

Column 5, line 18, change "is" to --are--.

Column 6, line 44, change "continuouswove" to --continuous-wave--.

Column 7, line 23, change "comprises" to --comprise--.

Column 8, line 6, change "satisfactorily" to --satisfactory--.

Column 9, line 5, omit the word "it".

Column 9, line 14, between "core" and "divided" insert the word --is--.

Column 10, line 40, omit the word "of".

Column 10, line 55, change "Distanoe" to --Distance--.

Column 10, line 68, change 1 ns-100" to --1 nS-100--.

Column 11, line 15, change "Example" to --Examples--.

UNITED STATES PATENT AND TRADEMARK OFFICE
CERTIFICATE OF CORRECTION

PATENT NO. : 4,613,842

DATED : September 23, 1986

INVENTOR(S) : T. Ichiyama, et al.

It is certified that error appears in the above-identified patent and that said Letters Patent is hereby corrected as shown below:

Column 12, line 13, change "element" to --elements--.

Column 12, line 51, omit the word "and".

Column 12, line 66, change "being" to --is--.

Signed and Sealed this

Thirty-first Day of March, 1987

Attest:

DONALD J. QUIGG

Attesting Officer

Commissioner of Patents and Trademarks